United States Patent [19]

Isono

[11] 4,251,832
[45] Feb. 17, 1981

[54] INDEX SIGNAL AMPLIFIER FOR USE IN A BEAM INDEX TELEVISION RECEIVER

[75] Inventor: Katsuo Isono, Kawagoe, Japan

[73] Assignee: Sony Corporation, Tokyo, Japan

[21] Appl. No.: 88,850

[22] Filed: Oct. 29, 1979

[30] Foreign Application Priority Data

Oct. 30, 1978 [JP] Japan ................................ 53-133467
Oct. 30, 1978 [JP] Japan ................................ 53-133468
Oct. 30, 1978 [JP] Japan ................................ 53-133469

[51] Int. Cl.³ ............................................. H04N 9/24
[52] U.S. Cl. ....................................... 358/67; 358/69
[58] Field of Search .............................. 358/66, 67, 69

[56] References Cited

U.S. PATENT DOCUMENTS

| 3,098,896 | 7/1963 | Lynch et al. | 358/67 |
| 3,305,628 | 2/1967 | Kitamura | 358/67 |

Primary Examiner—Robert L. Richardson
Attorney, Agent, or Firm—Lewis H. Eslinger; Alvin Sinderbrand

[57] ABSTRACT

An index signal amplifier arrangement is disclosed for use in a beam index color television receiver of a type which includes a picture reproducer having index stripes disposed to be scanned by an electron beam and a photodetector for detecting when respective index stripes are scanned by the beam to produce an index signal. A local oscillator generates a local oscillating signal which is mixed with the index signal produced by the photodetector. The mixed signal is amplified by a band-pass amplifier, the latter preferably being formed of a band-pass filter having a predetermined, limited pass-band characteristic substantially centered on the expected frequency of the mixed signal, and a limiter amplifier coupled to the band-pass filter for removing amplitude modulations from the filtered mixed signal. Another mixer is coupled to the band-pass amplifier and also to the local oscillator for mixing the amplified mixed signal with the local oscillating signal to produce an amplified index signal having the index frequency. If the local oscillating signal frequency can be adjusted to "match" the particular picture reproducer which is used in the color television receiver, then the frequency of the mixed local oscillating and index signals will be constant from one picture reproducer to the next. Consequently, a standardized, or uniform band-pass amplifier may be provided for all picture reproducers.

15 Claims, 8 Drawing Figures

INDEX SIGNAL AMPLIFIER FOR USE IN A BEAM INDEX TELEVISION RECEIVER

BACKGROUND OF THE INVENTION

This invention relates to an index signal amplifier for use in a beam index color television receiver and, more particularly, to such an index signal amplifier which can exhibit standardized characteristics so as to be used in various beam index color television receivers.

A beam index color television receiver is provided with a cathode ray tube (CRT) having a single electron beam which scans the color phosphor elements provided on the display screen of the CRT, the scanning electron beam being modulated with the appropriate color information as the beam scans the respective color elements. This differs from a conventional color CRT in which three individual electron beams simultaneously scan the color phosphor stripes, with each beam being modulated with its associated color information.

In the beam index color television receiver, an index signal is generated in synchronism with the scanning of the electron beam, this index signal being used to control a color switching circuit whereby the proper color information is "switched" to modulate the single beam at the proper time. That is, when the single beam reaches the red element, red information is switched to modulate the beam intensity; and then when the beam reaches the green element, the green information is switched to modulate the beam intensity; and then when the beam reaches the blue element, the blue information is switched to modulate the beam intensity. In order to generate the index signal for controlling the color switching operation, the CRT also is provided with index stripes, such as special phosphor stripes, disposed at or in the vicinity of the display screen, whereby the index stripes are scanned as the beam scans the color phosphor elements. These index stripes are uniformly spaced, and each is excited by the scanning beam so as to emit light when the beam is incident thereon. A photodetector is disposed to receive the light emitted by each of the scanned index stripes, this photodetector generally being provided on the envelope of the CRT. Hence, as the beam scans a raster, the photodetector generates an index signal having an index frequency which is a function of the scanning speed of the beam and the pitch of the index stripe. This index signal derived from the photodetector is used to control the color switching operation whereby the proper color information is switched to modulate the beam intensity at the proper times during each scanning trace of the beam.

In general, the amplitude of the index signal produced by the photodetector is too low to effect the proper control over the color switching operation. Hence, it is necessary to amplify that index signal. This amplification may be performed by a band-pass amplifier whose center frequency is equal to the expected index frequency. However, for proper amplification of the generated index signal, it is necessary that the gain of this amplifier be relatively high, such as on the order of about 60 dB. At the relatively high frequency of the index signal, the high gain of this amplifier results in an undesired feedback effect, whereby the amplified index signal is injected back into the input of this amplifier, thereby causing regenerative feedback. This, in turn, results in undesired oscillation of the amplifier. Such oscillation substantially interferes with the proper index signal, thereby introducing errors into the color switching arrangement for the CRT.

Another disadvantage of providing a simple amplifier for amplifying the index signal generated by the photodetector is that the frequency of the index signal may vary from one tube to another. For example, if the size of the CRT, that is, the display screen of the CRT, is increased, the scanning speed of the electron beam likewise is increased; and if the pitch of the index stripes remains the same, the frequency of the index signal is increased. As a result thereof, the index frequency no longer coincides with the center frequency of the band-pass amplifier. Hence, a separate band-pass amplifier must be provided for this larger cathode ray tube. It is, therefore, appreciated that different band-pass amplifiers must be provided for the different sizes of CRT's which can be used in the beam index color television receiver. Furthermore, even with CRT's of the same size, small differences in the physical parameters from one tube to another may result in correspondingly different index frequencies, thereby requiring band-pass amplifiers tuned to different center frequencies. It should be recognized that these disadvantages prevent the desired standardization of the band-pass amplifier for use in all beam index CRT's. Consequently, since different amplifiers must be designed for the different tubes, the cost of manufacturing and assembling such beam index color television receivers is relatively high.

OBJECTS OF THE INVENTION

Therefore, it is an object of the present invention to provide an improved index signal amplifier for use in a beam index color television receiver, whereby the aforenoted problems and disadvantages are avoided.

Another object of this invention is to provide a standardized index signal amplifier which can be used in various different types of beam index cathode ray tubes, even though the index signal frequency in one tube may differ from that in another.

A further object of this invention is to provide an index signal amplifier from which an amplified index signal is derived having the correct index frequency associated with the beam index cathode ray tube.

An additional object of this invention is to provide an index signal amplifier for use in a beam index cathode ray tube, in which changes in the scanning speed of the beam which will cause changes in the index signal frequency are detected and corrected.

Still another object of this invention is to provide an index signal amplifier for use in a beam index color television receiver, including a band-pass amplifier which is supplied with a signal derived from the index signal, the derived signal having a substantially constant frequency regardless of changes in the index signal frequency.

Various other objects, advantages and features of the present invention will become readily apparent from the ensuing detailed description, and the novel features will be particularly pointed out in the appended claims.

SUMMARY OF THE INVENTION

In accordance with the present invention, an index signal amplifier is provided for use in a beam index color television receiver of the type including a picture reproducer, such as a cathode ray tube, having index stripes disposed to be scanned by an electron beam, and a photodetector for detecting when respective index stripes are scanned by the beam to produce an index signal having an index frequency. A local oscillator generates a local oscillating signal which is mixed with the index signal to produce a mixed signal. The mixed signal is amplified by a band-pass amplifier, and the amplified, mixed signal then is mixed with the local oscillating signal to produce an amplified index signal having the index frequency. Preferably, the local oscillator is adjustable so as to vary the local oscillating signal frequency to "match" the particular characteristics of the cathode ray tube with which it is used. If, because of the characteristics of the cathode ray tube, the frequency of the index signal differs from that produced in another tube, the local oscillating frequency also may be changed such that the mixed signal supplied to the band-pass amplifier nevertheless exhibits a constant, predetermined frequency. This enables the band-pass filter to be formed with a standardized pass-band and gain regardless of the particular cathode ray tube with which it is used.

In accordance with another aspect of this invention, a detector is provided to detect a change in the frequency of the index signal, as may be due to a variation in the scanning speed of the electron beam, and to correct for this change in frequency. In one embodiment, the scanning speed of the beam is corrected so as to return the index signal frequency to its expected value. In another embodiment, the frequency of the local oscillating signal is changed such that, even though the index frequency has varied, the frequency of the mixed signal which is supplied to the band-pass amplifier nevertheless remains the same.

BRIEF DESCRIPTION OF THE DRAWINGS

The following detailed description, even by way of example, will best be understood in conjunction with the accompanying drawings in which.

DETAILED DESCRIPTION OF PREFERRED EMBODIMENTS

Figure 1:
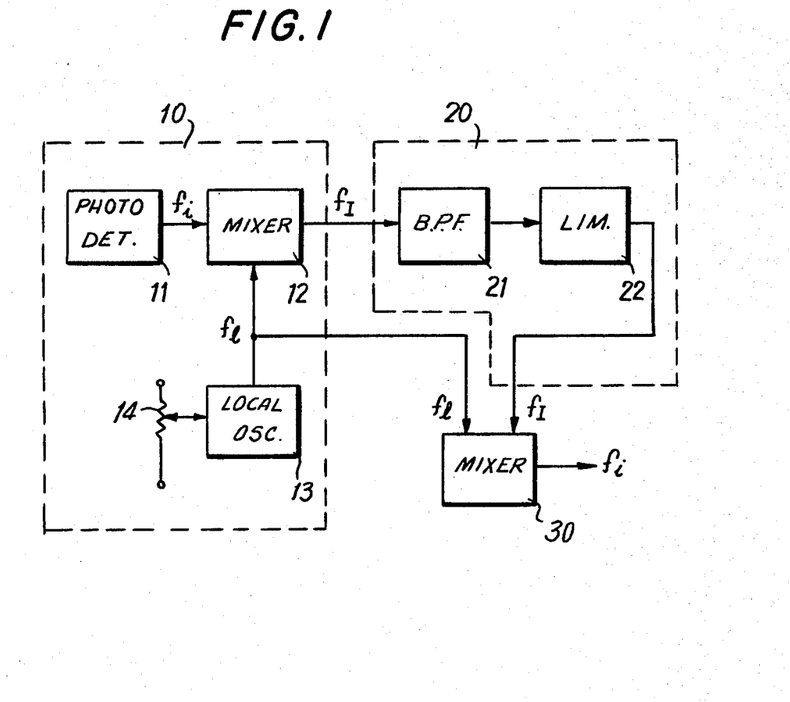
FIG. 1 is a block diagram of one embodiment of an index signal amplifier in accordance with the present invention.

Referring now to the drawings, wherein like reference numerals are used throughout, one embodiment of the index signal amplifier of the present invention is illustrated in FIG. 1. The use of this amplifier in a beam index color television receiver is described below with reference to FIG. 8. Further description of a beam index color television receiver with which this invention can be used is found in copending application Ser. No. 78,206. The embodiment shown in FIG. 1 is comprised of a mixing stage 10, a band-pass amplifying stage 20 and an output mixer 30. Mixing stage 10 is adapted to mix, or heterodyne, the index signal generated by the usual photodetector provided in the beam index color cathode ray tube, described above and also described in the aforementioned copending application, with a local oscillating signal. Accordingly, the mixing stage is comprised of a mixer 12 having one input coupled to a photodetector 11 and another input coupled to a local oscillator 13. The photodetector supplies the index signal of index frequency $f_i$ to mixer 12. Local oscillator 13 preferably is an adjustable oscillator such that the frequency of the local oscillating signal generated thereby may be varied as desired. To this effect, local oscillator 13 is illustrated as being connected to a variable resistor 14. It is appreciated that the frequency of the local oscillating signal is determined by the setting of the variable resistor.

Mixer 12 mixes the index signal of index frequency $f_i$ with the local oscillating signal of frequency $f_1$ to produce a mixed signal of frequency $f_I$. Mixer 12 may be conventional so as to produce upper and lower sidebands of the mixed signals, the upper sideband having a frequency equal to the sum of the mixed signal frequencies and the lower sideband having a frequency equal to the difference between the mixed signal frequencies. Preferably, the upper sideband is selected from mixer 12, such that the mixed signal frequency $f_I = f_i + f_1$. This mixed signal is supplied to band-pass amplifying stage 20.

The purpose of the band-pass amplifying stage is to provide suitable amplification of the mixed signal received from mixer 12. Preferably, the band-pass amplifier has a limited passband range that is centered on the expected mixed signal frequency $f_I$. Furthermore, the gain of the band-pass amplifier is chosen to be relatively high to produce an amplified mixed signal of substantially constant amplitude. For this purpose, the band-pass amplifying stage is comprised of a band-pass filter 21 and a limiter amplifier 22. Band-pass filter 21 may be of conventional construction whose pass band is centered on the mixed signal frequency $f_I$ and is adapted to attenuate signals of a so-called disturbing frequency which may be outside this passband. Desirably, the passband characteristic of band-pass filter 21 is relatively narrow. Limiter amplifier 22 is adapted to suppress an amplitude modulating component that might be present in the index signal, and which may be transferred to the mixed signal produced by mixer 12. Furthermore, since the amplitude of the index signal generated by photodetector 11 is determined by the intensity, or level, of the electron beam current, and since this beam current level may vary from, for example, about 1 microamp to about 1000 microamps, or over a range having a factor of 1000, an analogous range in the index signal amplitude must be accommodated by limiter 22. It is appreciated that the amplitude of the mixed signal produced by mixer 12 will vary as the amplitude of the index signal varies. Thus, limiter 22 must exhibit an appropriate gain, or amplifying level, so as to produce an amplified, mixed signal of constant amplitude even though the amplitude of the index signal may vary widely over the aforementioned range. In accordance with the foregoing, limiter 22 has a limiter characteristic, or gain, of about 60 dB. Such an amplifier limiter circuit for use with the mixed signal of frequency $f_I$ may be constructed easily by one of ordinary skill in the art.

Hence, further description of this limiter amplifier is not provided.

If limiter amplifier 22 exhibits a gain of about 60 dB, it will be recognized that band-pass filter 21 exhibits an attenuating characteristic of about 60 dB for likely frequency disturbances. Such a filtering characteristic may be implemented easily by one of ordinary skill in the art.

The amplified mixed signal $f_I$ produced by band-pass amplifier 12, and derived from limiter amplifier 22, is supplied to output mixer 30 together with the oscillating signal of frequency $f_1$ generated by local oscillator 13. The output mixer may be of conventional construction to heterodyne the input signals supplied thereto and, preferably, the lower sideband of these heterodyned signals is selected. Thus, the output of mixer 30 is an amplified index signal of index frequency $f_i = f_I - f_1$. That is, if the upper sideband is selected from mixer 12, the lower sideband is selected from output mixer 30, and vice versa.

As a typical numerical example of the operation of the index signal amplifier shown in FIG. 1, let it be assumed that the index frequency $f_i$ of the index signal supplied to mixer 12 by photodetector 11 is on the order of about 12 MHz. Let it be further assumed that the frequency $f_1$ of the local oscillating signal generated by local oscillator 13 is set to be equal to about 18 MHz. The frequency $f_I$ of the mixed signal produced by mixer 12 is equal to the sum of the index and local oscillating frequencies, and is equal to 30 MHz. It is appreciated that the frequency $f_I$ may be determined, as desired, by frequency $f_1$ of the local oscillating signal, and the frequency $f_I$ should be selected such that it does not interfere or disturb the other signals normally produced in the various television circuits.

The mixed signal produced by mixer 12 is filtered by band-pass filter 21 so as to remove or suppress undesired or disturbing frequency components or signals from the mixed signal; and the filtered mixed signal is amplitude-limited by limiter amplifier 22 so as to remove or suppress amplitude modulating components therefrom. Thus, the output of band-pass amplifier 20 is constituted, essentially, by an amplified mixed signal of constant amplitude having the frequency $f_I$ equal to 30 MHz. This 30 MHz signal is converted, in output mixer 30, back to the index frequency of 12 MHz, this re-converted index signal thus exhibiting the proper index frequency and also a constant, predetermined amplitude. It is appreciated that this amplitude is sufficient to control satisfactorily the color switching operation which is the intended purpose of the index signal.

Let it be assumed that the index signal amplifier shown in FIG. 1 is used in a beam index color television receiver wherein the color cathode ray tube is of a size such that the index signal frequency $f_i$ is equal to 10 MHz. If the frequency $f_1$ of the local oscillating signal remains fixed at 18 MHz, it is seen that the frequency $f_I$ of the mixed signal which is supplied to band-pass amplifying stage 20 is equal to 28 MHz. This frequency does not correspond to the center frequency of band-pass filter 21 and, consequently, the mixed signal may be attenuated. This disadvantage is avoided by adjusting variable resistor 14 so as to increase the frequency $f_1$ of local oscillator 13 to 20 MHz. With this changed frequency, the mixing of the index and local oscillating signals results in a mixed signal frequency $f_I$ of 30 MHz, the center frequency of the band-pass amplifying stage. Therefore, it is appreciated that one important advantage of the present invention is that the band-pass amplifying stage may be standardized, that is, it may be constructed to have a predetermined passband and a predetermined gain, such that it can be used with any size beam index cathode ray tube. Even though the frequency $f_I$ of the index signal may vary from one tube to another, this variation may be accounted for by adjusting the frequency $f_1$ of the local oscillating signal. Therefore, regardless of the particular characteristics of the cathode ray tube with which the band-pass amplifying stage is used, this stage always receives a mixed signal of constant, predetermined frequency $f_I$. This facilitates the design of the band-pass amplifying stage and, moreover, since this design can be standardized for all beam index cathode ray tubes, regardless of the size of the display screen, the pitch of the index stripes, the method employed to provide the index stripes, etc., the overall cost of manufacturing the color television receiver with which the index signal amplifier is used can be reduced. This, of course, is advantageous in mass produced assembly line production. By standardizing the band-pass amplifying stage, the respective band-pass filter and limiter amplifier circuits may be designed to exhibit optimum characteristics. This is a further improvement in that the band-pass amplifying stage is sure to suppress disturbing frequencies, while exhibiting proper gain.

Figure 2:
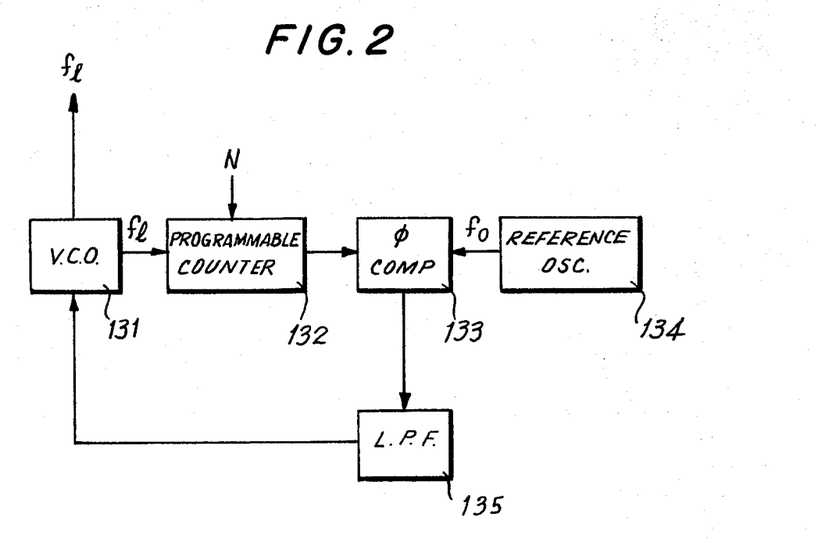
FIG. 2 is a block diagram of one embodiment of the local oscillator which can be used in FIG. 1.

In the embodiment shown in FIG. 1, the frequency of local oscillator 13 is adjustable as a function of the setting of variable resistor 14. The local oscillator may exhibit different preset frequencies which can be selected as desired. An example of such a local oscillator and a circuit used to select the proper frequency of that local oscillator are illustrated in FIG. 2. As shown therein, the local oscillator is a voltage-controlled oscillator (VCO) 131. The circuit which is used to control the frequency of VCO 131 is a phase-locked loop comprised of a programmable frequency divider 132, a phase comparator 133, a reference oscillator 134 and a low-pass filter 135. VCO 131 may be of conventional construction and is responsive to a control signal supplied thereto to set the frequency $f_1$ of the oscillating signal generated thereby. This oscillating signal is supplied to mixer 12 (FIG. 1) and a rectangular waveform version of this local oscillating signal is supplied to the phase-locked loop.

Programmable frequency divider 132 is adapted to divide the frequency $f_1$ of the local oscillating signal generated by VCO 131 by a factor N. The programmable frequency divider thus may be a conventional digital counter adapted to be set to a count determined by an input digital signal (represented by the input digital signal N), and to count from this preset signal to a predetermined count, thereupon the count of the digital counter is reset to the preset count N. The count of this digital counter is incremented in response to each rectangular pulse included in the local oscillating signal supplied by VCO 131. The digital counter produces an output pulse each time that its predetermined count is reached. Hence, it is seen that the frequency of the output pulses produced by this digital counter is determined by the preset count N to which it is preset. As this preset count is changed, for example, as the input digital signal N is changed, the frequency of the output pulses generated by the digital counter is correspondingly changed. Thus, since the preset count is programmable, that is, it is selected by the digital signal N, the digital counter functions as a programmable frequency divider.

Phase comparator 133 is connected to programmable frequency divider 132 and also to reference oscillator 134 to receive the respective oscillating signals, or pulses, generated thereby. The phase comparator may be of conventional construction and is adapted to compare the phase of the frequency-divided local oscillating signal, of frequency $f_1/N$, to the phase of the reference signal of frequency $f_o$. Phase comparator 133 produces an error signal which is a function of the phase differential between these oscillating signals. This error signal is filtered by low pass filter 135 to produce a DC control signal, and this DC control signal is fed back to VCO 131. The local oscillating frequency $f_1$ of VCO 131 is determined as a function of the fed back DC control signal.

In operation, the programmed frequency dividing ratio of programmable frequency divider 132 is preset as a function of the size of the display screen of the cathode ray tube, or of the method which is used to produce the index stripes, etc. This frequency dividing ratio N results in a frequency-divided local oscillating signal supplied to phase comparator 133 of frequency $f_1/N$. If this frequency $f_1/N$ differs from the reference frequency $f_o$, the DC control signal which is fed back to VCO 131 serves to adjust the oscillating frequency of the VCO such that $f_1/N = f_o$. Hence, the local oscillating frequency $f_1$ is changed, as determined by the programmed digital signal N, so as to account for the particular characteristics of the cathode ray tube in which the illustrated circuitry is used. As described above with respect to FIG. 1, this change in the local oscillating frequency $f_1$ compensates the change in the index frequency $f_i$ due to the particular characteristics of the beam index cathode ray tube. That is, even though such characteristics vary from one tube to another, the fact that the local oscillating frequency $f_1$ is changed so as to match such characteristics means that the frequency $f_I$ of the mixed signal supplied to band-pass amplifying stage 20 remains constant.

The frequency $f_1$ of the reference oscillating signal generated by reference oscillator 134 may be derived from the color subcarrier oscillator that normally is provided in a color television receiver. That is, the color subcarrier frequency $f_s$ generated by the subcarrier oscillator may be multiplied by a factor n/m (where m and n are integers) to produce the reference frequency $f_o$.

In a cathode ray tube, including a beam index color cathode ray tube, the electron beam may scan in a non-linear manner. This may be attributed to non-linearity of the deflection yokes, or to drift in the high voltage section of the cathode ray tube, or the like. Consequently, because of this non-linearity in the scanning speed of the beam, a dynamic change in the index frequency $f_i$ of the index signal may occur. This dynamic change in the index frequency will, of course, be present as a corresponding dynamic change in the frequency $f_I$ of the mixed signal supplied to band-pass amplifying stage 20. In order to accommodate this dynamic change in the frequency $f_I$, the passband of the bandpass amplifying stage, and particularly that of band-pass filter 21, should be sufficiently wide. This may tend to degrade the band-pass amplifying characteristics of the band-pass amplifying stage. Furthermore, because of the dynamic change in the scanning speed of the beam with the concomitant dynamic change in the index frequency $f_i$, the phasing, or timing, of the color switching operation may vary, thereby deteriorating the color purity in the displayed video picture. That is, beacuse of the dynamic change in the index frequency $f_i$, the red (or green or blue) information may be switched to modulate the electron beam at a time prior (or subsequent) to the time that the beam reaches the red (or green or blue) phosphor element.

Figure 3:
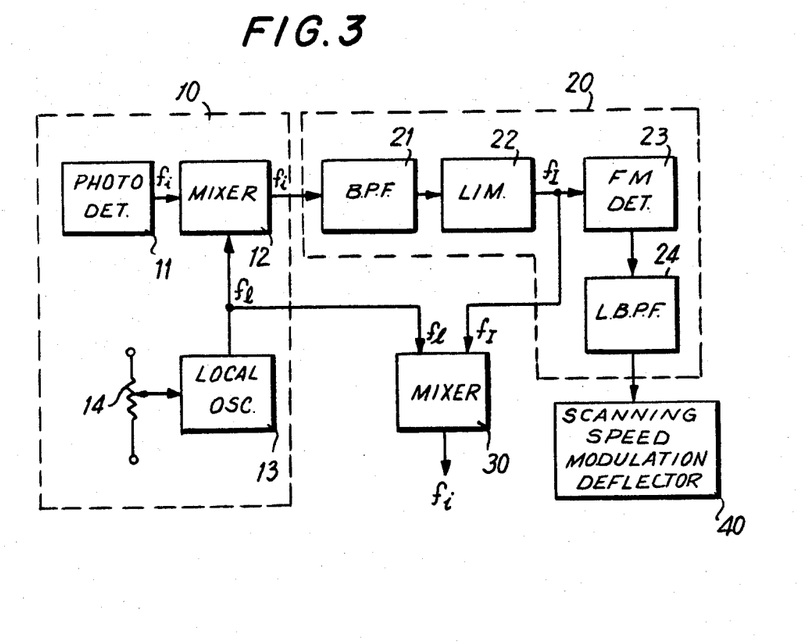
FIG. 3 is a block diagram of another embodiment of the present invention.

The difficulty of a dynamic change in the frequency $f_I$ relative to the center frequency of band-pass amplifying stage 20 is avoided by the embodiments illustrated in FIGS. 3-7. Turning first to FIG. 3, this embodiment is seen to be substantially similar to the embodiment discussed above with respect to FIG. 1, except that the amplified mixed signal produced by limiter amplifier 22 is, in addition to being supplied to output mixer 30, also supplied to a detector for detecting a change in the frequency $f_I$. This detector is shown as a frequency modulation (FM) detector 23 which, as is conventional, detects a change or shift in the frequency $f_I$. The FM detector exhibits a center frequency which is substantially equal to the expected frequency $f_I$ of the amplified mixed signal supplied by limiter amplifier 22. Any deviation in the frequency $f_I$ from this center frequency results in a signal whose amplitude represents such deviation. As examples thereof, FM detector 23 may be formed as a Foster-Seeley detector, a ratio detector, an orthogonal phase detector, or the like. Such an FM detector may be constructed as an integrated circuit. The detected signal produced at the output of FM detector 23 whose amplitude represents the deviation in the frequency $f_I$ from its expected predetermined frequency value, is supplied to a low band-pass filter 24. This filter functions to integrate the detected signal output from FM detector 23 so as to derive an error voltage representing the deviation in the frequency $f_I$ from its expected value.

It is recalled that this deviation in the frequency $f_I$ from its expected value is attributed to variations in the scanning speed of the electron beam. The error voltage, or DC signal produced by low band-pass filter 24, is utilized to correct or compensate for this variation in scanning speed. Accordingly, this error voltage is supplied to a scanning speed modulation deflector 40 which is responsive to the error voltage to vary the scanning speed of the beam in a direction which compensates for the undesired change therein. That is, if the error voltage derived from low band-pass filter 24 represents that the scanning speed of the beam has decreased, scanning speed modulation deflector 40 serves to increase the scanning speed by a corresponding amount. Conversely, if the error voltage derived from the low band-pass filter represents that the scanning speed of the beam has increased, the scanning speed modulation deflector functions to decrease that scanning speed. Typical examples of a suitable scanning speed modulation deflector include a particularly shaped focusing electrode disposed in the neck of the cathode ray tube for acting on the electron beam which passes therethrough; the horizontal deflection coil of the cathode ray tube, and an auxiliary correcting coil which provides a correcting horizontal field for adjusting the deflection speed of the beam. Each of these devices is responsive to the error voltage derived from low band-pass filter 24 to adjust the scanning (or deflection) speed of the electron beam so as to correct for undesired variations therein.

Figure 5:
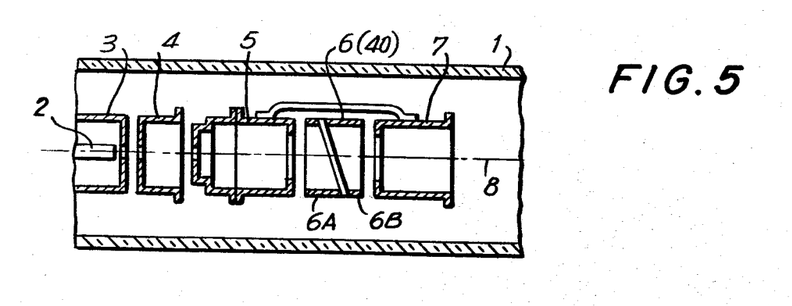
FIG. 5 is a schematic representation of a beam scanning speed modulator which can be used in the embodiments shown in FIGS. 3 and 4.

A schematic representation of a particularly shaped focusing electrode which can be used as the scanning speed modulation deflector is shown schematically in FIG. 5. This electrode is included in an electron gun arrangement disposed in the neck portion of the cathode ray tube. This electron gun arrangement is illustrated as comprising a cathode 2, a control electrode 3, an accelerating electrode 4, a first anode 5, the focusing electrode 6 and a second electrode 7, these electrodes all being arranged in succession and coaxial with the tube axis 8. Focusing electrode 6 is formed of two sections 6A and 6B which may be constituted by cutting a single cylindrical body at an intermediate portion therein at an angle with respect to its longitudinal axis. That is, sections 6A and 6B are separated by a diagonally aligned gap, as illustrated. Electrode sections 6A and 6B are supplied with a suitable focusing voltage which, as is known, may range from 0 to several thousand volts. The error voltage derived from low band-pass filter 24 (FIG. 3) is applied across electrode sections 6A and 6B. This error voltage applied across the electrode sections results in a varying field applied to the electron beam, resulting in a corresponding variation in the horizontal scanning speed of that beam. Hence, electrode sections 6A and 6B function to modulate the deflection speed of the beam and, therefore, are referred to herein as a scanning speed modulation deflector.

Returning to FIG. 3, the manner in which this embodiment operates now will be described. Let it be assumed that, because of a dynamic change in the scanning speed of the electron beam, the index frequency $f_i$ is subjected to a corresponding variation. This change in the index frequency also appears as a change in the frequency $f_I$ of the mixed signal supplied to band-pass amplifying stage 20 by mixer 12. If this change in the frequency $f_I$ is not corrected, it is appreciated that output mixer 30 will produce the amplified index signal of frequency $f_i$ which also exhibits the undesired variation due to the change in the beam scanning speed. This, in turn, deleteriously affects the color switching operation, resulting in modulating the electron beam with color information that is not properly phased. Hence, the color purity of the displayed video picture is distorted. Furthermore, the variation in the frequency $f_I$ will result in a shift of the frequency of the mixed signal relative to the center frequency of the band-pass amplifying stage. This means that the optimum characteristics of the band-pass amplifying stage are not utilized.

However, as the frequency $f_I$ of the amplified mixed signal, as produced by limiter amplifier 22, varies from its expected predetermined value, this variation is detected by FM detector 23. The detected signal amplitude produced by the FM detector is filtered by low band-pass filter 24 so as to supply an error voltage to scanning speed modulation deflector 40. More particularly, this error voltage is applied across electrode sections 6A and 6B (FIG. 5) of the particularly shaped focusing electrode so as to vary the field applied to the scanning electron beam, with the desired result that the deflection speed of the beam is changed. This change, which is a function of the error voltage produced by low band-pass filter 24, corrects or compensates for the dynamic change in the scanning speed which had caused the dynamic variation in the index frequency $f_i$. Thus, scanning speed modulation deflector 40 serves to deflect the electron beam so as to correct the undesired change therein.

As a result of this correction in the scanning speed of the electron beam, the index frequency $f_i$ of the index signal produced by photodetector 11 returns to its expected frequency value. Hence, the frequency $f_I$ of the mixed signal produced by mixer 12 also returns to its expected frequency value which, it is recalled, is equal to the center frequency of band-pass amplifying stage 20. Hence, the closed loop comprised of photodetector 11, mixer 12, band-pass filter 21, limiter amplifier 22, FM detector 23, low band-pass filter 24 and scanning speed modulation deflector 40 is operative to maintain the scanning speed of the electron beam at its proper, desired value. As a result thereof, index frequency $f_i$ is maintained at its expected value.

In the embodiment shown in FIG. 3, the local oscillating frequency $f_1$ of local oscillator 13 is set by the adjustment of variable resistor 14, as discussed above with respect to FIG. 1. Thus, in this FIG. 3 embodiment, the index frequency $f_i$ of the index signal produced by photodetector 11, and more importantly, the index frequency $f_i$ of the amplified index signal produced by output mixer 30, is maintained at a proper frequency value matched to the particular characteristics of the cathode ray tube with which this apparatus is used. More particularly, the local oscillating frequency $f_l$ is set to a frequency associated with the size of the cathode ray tube display screen, or the method which is used to provide the index stripes, and scanning speed modulation deflector 40 is operable to correct for dynamic changes in the scanning speed of the electron beam so as to maintain that beam at its proper deflection rate. Thus, the frequency $f_i$ of the amplified index signal, as produced by output mixer 30, remains substantially constant and matched to the particular characteristics of the cathode ray tube from which it is derived. Moreover, since the frequency $f_I$ of the mixed signal produced by mixer 12 remains constant, regardless of the particular characteristics of the cathode ray tube with which the illustrated apparatus is used, and regardless of dynamic changes in the scanning speed of the electron beam (which changes are corrected by scanning speed modulation deflector 40), band-pass filter 21 and limiter amplifier 22 may be designed with optimum characteristics and standardized for all beam index color cathode ray tubes. That is, the band-pass filter can be designed easily to exhibit a narrow passband characteristic having a high Q such that it accurately suppresses, or attenuates, the so-called disturbing signal components. Also, limiter amplifier 22 may be designed easily so as to exhibit its desired gain on the order of about 60 dB.

Figure 4:
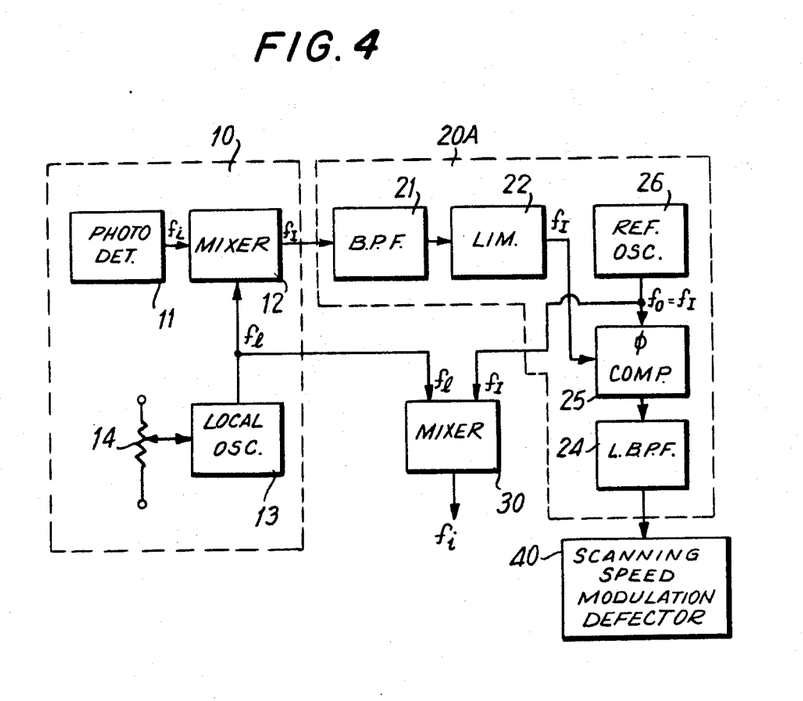
FIG. 4 is a block diagram of a still further embodiment of the present invention.

Another embodiment of the present invention which maintains a constant frequency $f_I$ in the mixed signal produced by mixer 12 and, moreover, corrects for dynamic variations in the scanning speed of the electron beam, is illustrated in FIG. 4. This embodiment includes the usual mixing stage 10 to produce a mixed signal of frequency $f_I$. This mixed signal is supplied to band-pass amplifying stage 20A which includes band-pass filter 21 and limiter amplifier 22, these components having been described in detail hereinabove. The amplified mixed signal produced by limiter amplifier 22 is supplied to a detector comprised of phase comparator 25 and reference oscillator 26 for the purpose of detecting a change in frequency $f_I$ from its expected frequency value. Reference oscillator 26 generates a reference signal of frequency $f_o$, this frequency being set equal to the expected frequency $f_I$ of the mixed signal. Phase comparator 25 is of conventional construction and is adapted to compare the phase of the amplified mixed signal supplied thereto from limiter amplifier 22 to the phase of the reference signal supplied thereto by reference oscillator 26. In the event of any phase differential therebetween, as may be caused by a variation or change in the frequency $f_I$ of the amplified mixed signal produced by limiter amplifier 22, phase comparator 25 produces a detected signal which serves as an error voltage. This error voltage, which is similar to that produced by FM detector 23 in the FIG. 3 embodiment, is supplied through low band-pass filter 24 as a DC signal; and this DC signal is applied to scanning speed modulation deflector 40. The scanning speed modulation deflector in the embodiment of FIG. 4 may be similar to those deflectors described hereinabove with reference to the embodiment shown in FIG. 3, and in particular, such deflector may be of the type shown in FIG. 5.

It is appreciated that the primary difference between the embodiments of FIGS. 3 and 4 is that FM detector 23, utilizing the FIG. 3 embodiment, is replaced by phase comparator 25 and reference oscillator 26 in the FIG. 4 embodiment. Nevertheless, in the FIG. 4 embodiment, the combination of photodetector 11, mixer 12, band-pass filter 21, limiter 22, phase comparator 25, reference oscillator 26, low band-pass filter 24 and scanning speed modulation deflector 40 functions as a closed loop to correct for changes in the scanning speed of the electron beam. Since local oscillator 13 generates a local oscillating signal of fixed frequency $f_l$, any change in the scanning speed of the beam produces a corresponding change, or variation, in the index frequency $f_i$. Consequently, the frequency $f_I$ of the mixed signal produced by mixer 12, and the frequency $f_I$ of the amplified mixed signal produced by limiter amplifier 22 contain a similar frequency variation. The frequency-change detector formed of phase comparator 25, reference oscillator 26 and low band-pass filter 24 serves to detect this variation in the index frequency to supply the DC control signal to scanning speed modulation deflector 40 so as to correct or compensate (i.e., cancel) this frequency variation. Hence, even though the index frequency $f_i$ may undergo a dynamic change, the apparatus illustrated in FIG. 4 is operative to return the index frequency to its desired, predetermined value. That is, this apparatus assures that the frequency $f_I$ of the mixed signal remains constant, notwithstanding dynamic changes in the index frequency $f_i$.

Since the index frequency $f_I$ of the amplified mixed signal produced by limiter amplifier 22 always remains constant, and since the reference frequency $f_o=f_I$, output mixer 30 may be supplied with the reference signal in place of the amplified mixed signal. This is shown in FIG. 4 and constitutes another difference between this embodiment and the aforedescribed embodiment of FIG. 3. Nevertheless, it should be readily appreciated that output mixer 30 in both embodiments is supplied with an amplified signal of constant frequency $f_I$, whereby the output mixer re-converts this frequency back to the index frequency $f_i$ by mixing the amplified signal with the local oscillating signal of frequency $f_l$. In the embodiment of FIG. 4, the reference signal generated by reference oscillator 26 may be considered to be a simulated amplified mixed signal. This is because the reference frequency $f_o$ is equal to $f_I$. Furthermore, the amplitude of this reference signal may be equal to the amplitude of the amplified mixed signal produced by limiter amplifier 22. Consequently, for all practical purposes, the reference signal supplied to output mixer 30 in the embodiment of FIG. 4 is the same as the amplified mixed signal. For this reason, and for the purpose of the description of the invention herein, reference oscillator 26 and phase comparator 25, together with low band-pass filter 24, all are considered to be included in band-pass amplifying stage 20A.

The reference signal of frequency $f_o$ may be derived from the local color subcarrier signal generated by the usual color subcarrier oscillator normally provided in a color television receiver. This local color subcarrier may be multiplied by the factor n/m, wherein m and n are integers, in order to produce the reference frequency $f_o$.

The closed loop shown in the embodiment of FIG. 4 functions in substantially the same way as the aforedescribed closed loop of FIG. 3; and is operative to maintain the frequency $f_I$ produced by mixer 12 at a constant value. Dynamic changes in the scanning speed of the electron beam, which result in corresponding changes in the index frequency $f_i$, are compensated. Since the frequency $f_I$ remains constant and is controlled to be equal to the reference frequency $f_o$, and since the local oscillating frequency $f_l$ remains constant, it is appreciated that output mixer 30 produces an amplified index signal of constant index frequency $f_i$. This amplified index signal is stabilized and is of constant amplitude.

Figure 6:
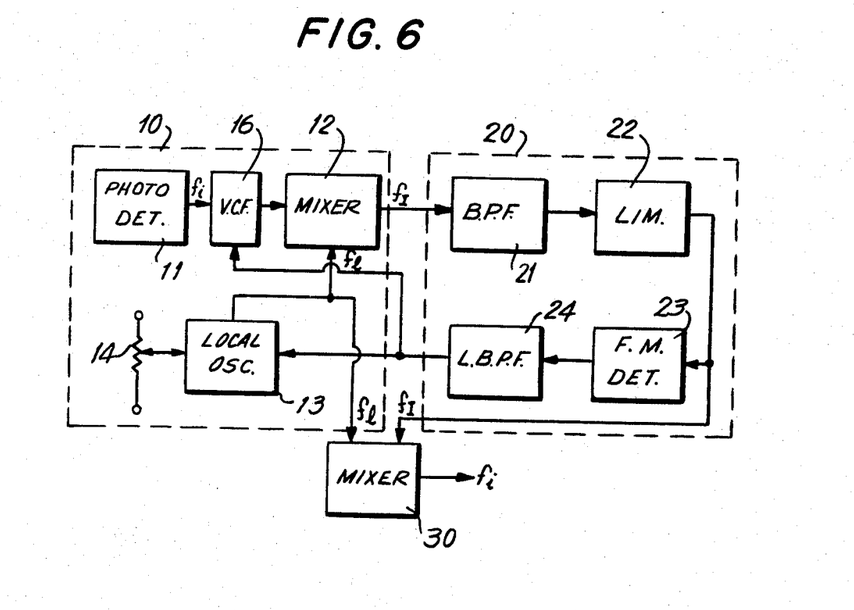
FIG. 6 is a block diagram of a still further embodiment of the present invention.

In the embodiments shown in FIGS. 3 and 4, although the use of a closed loop compensates, or corrects, for dynamic changes in the index frequency $f_i$, the scanning speed modulation deflector, such as the deflector device shown in FIG. 5, exhibits a time delay. That is, there is a finite delay between the time that the dynamic change in the index frequency $f_i$ is detected and the time that scanning speed modulation deflector 40 responds to this detected change to compensate such change. As a result of this time delay, the frequency $f_I$ of the mixed signal, as produced by mixer 12, will be able to undergo a corresponding change. Hence, band-pass amplifying stage 20 (or 20A) would have to be provided with a sufficient bandwidth, or passband, to accommodate this variation in the frequency $f_I$. The embodiment shown in FIG. 6 provides a closed loop feedback control to provide rapid correction, or compensation, for a change in the frequency $f_I$. The FIG. 6 embodiment differs from that described above with respect to FIG. 3 in that the index signal generated by photodetector 11 is supplied to mixer 12 via a voltage controlled filter 16, this voltage controlled filter being of known construction and having a center frequency that is variable and determined by a DC control signal. As shown in FIG. 6, the filter control signal supplied to voltage controlled filter 16 is the DC signal produced by low band-pass filter 24 in response to the detected frequency-change signal from FM detector 23. Furthermore, in the embodiment of FIG. 6, local oscillator 13 is a voltage controlled oscillator whose oscillating frequency also is controlled by the DC signal produced by low band-pass filter 24.

In operation, if the index frequency $f_i$ generated by photodetector 11 undergoes a dynamic change during the scanning of the electron beam, a corresponding change is introduced into the frequency $f_I$ of the mixed signal produced by mixer 12. Since the frequency $f_I$ now differs from its expected predetermined frequency, FM detector 23, whose center frequency is equal to the expected frequency $f_I$, generates a detected signal representing the change in frequency introduced into $f_I$. This detected signal is filtered by low band-pass filter 24 and supplied as a DC control signal both to local oscillator 13 and to voltage controlled filter 16. As a result of this DC control signal, which is an error signal representing the deviation in the frequency $f_f$ from its expected value, the center frequency of the voltage controlled filter is shifted so as to correspond to the shifted index frequency $f_i$. Thus, the voltage controlled filter follows, or tracks, the error voltage produced by low band-pass filter 24 so as to provide a properly filtered index signal to mixer 12, even as the frequency of the index signal changes dynamically. In addition, the frequency $f_l$ of the local oscillating signal generated by local oscillator 13 responds to the DC control signal supplied thereto by the low band-pass filter to shift in an opposite direction. As a result of this oppositely-directed shift in the local oscillating frequency $f_1$, mixer 20 produces a mixed signal of frequency $f_I$ which is equal to the expected predetermined frequency thereof.

As a numerical example of the foregoing, if the expected frequency value $f_I$ is 30 MHz, and if the normal index frequency $f_i$ is 12 MHz, it is appreciated that the normal local oscillating frequency $f_l$ is 18 MHz. However, if the index signal undergoes a dynamic change in frequency such that $f_i$ is reduced to 11.5 MHz, in the absence of a correction in the local oscillating frequency, the frequency $f_I$ of the mixed signal will be equal to 29.5 MHz. This shift in the frequency $f_I$ is detected by FM detector 23, and the DC control signal which represents this detected shift drives local oscillator 13 to produce the local oscillator frequency $f_l$ of 18.5 MHz. Also, the center frequency of voltage controlled filter 16 is shifted from 12 MHz to 11.5 MHz, so as to track the dynamic change in the index frequency $f_i$. Now, because of this correction in the local oscillating frequency $f_l$, the frequency $f_I$ of the mixed signal produced by mixer 12 once again is returned to its expected value of 30 MHz.

Thus, it is seen in the embodiment described with respect to FIG. 6, the frequency $f_I$ is maintained constant even though the index frequency $f_i$ may undergo a dynamic variation. The local oscillating frequency $f_l$ follows this dynamic variation in the index frequency such that the amplified index signal produced by output mixer 30 will exhibit the proper index frequency $f_i$. That is, the frequency of the amplified index signal will be equal to the frequency of the index signal generated by photodetector 11, notwithstanding dynamic changes therein.

Figure 7:
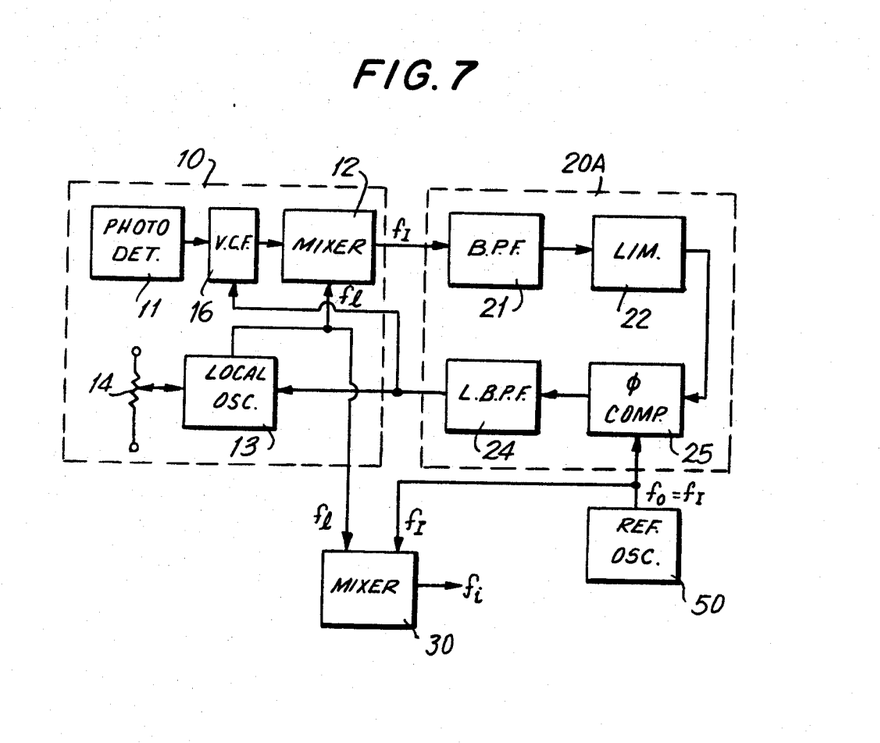
FIG. 7 is a block diagram of another embodiment of the present invention.

The embodiment shown in FIG. 7 is analogous to that shown in FIG. 6, except that the frequency-change detector is comprised of phase comparator 25 and a reference oscillator 50. Phase comparator 25 has been discussed hereinabove with respect to FIG. 4, and reference oscillator 50 may be similar to (if not the same as) aforedescribed reference oscillator 26. From the foregoing discussion of the FIG. 4 embodiment, it is appreciated that phase comparator 25 produces a detected signal representing the change in the frequency $f_I$ from its expected value. This detected signal is filtered by low band-pass filter 24 to produce a DC control signal similar to the DC control signal produced in the embodiment of FIG. 6. This DC control signal is supplied to control the center frequency of voltage controlled filter 16 and also to control the oscillating frequency $f_l$ of local oscillator 13. Since this has been discussed above with respect to FIG. 6, a further duplicative description is not provided herein.

As was described with respect to the FIG. 4 embodiment, reference oscillator 50 generates a reference signal of frequency $f_o$ which is equal to the expected frequency $f_I$ of the mixed signal produced by mixer 12. This reference signal is mixed with the local oscillating signal to recover the index frequency $f_i$ at output mixer 30. It is appreciated that, even though the index frequency $f_i$ of the index signal generated by photodetector 11 may undergo a dynamic change, the closed loop comprised of voltage controlled filter 16, mixer 13, band-pass filter 21, limiter amplifier 22, phase comparator 25, low band-pass filter 24 and local oscillator 13 serve to maintain the frequency $f_I$ at its constant expected value, notwithstanding this dynamic change in the index frequency. Therefore, since the frequency $f_I$ is maintained constant, there is no error in utilizing the reference frequency $f_o$ (wherein $f_o = f_I$) to be mixed with the local oscillating signal to recover an amplified index signal of proper index frequency $f_i$. This index frequency of the recovered, amplified index signal will, of course, vary as the index frequency of the index signal generated by photodetector 11 varies.

The embodiments of FIGS. 6 and 7 overcome the aforenoted time delays associated with the embodiments of FIGS. 3 and 4. Thus, in the event of a dynamic change in the index frequency, the embodiments of FIGS. 6 and 7 provide a rapid correction so as to maintain the frequency $f_I$ at its constant, expected value. However, the embodiments of FIGS. 6 and 7 are not provided with scanning speed modulation deflectors and, thus, do not correct or compensate for dynamic changes in the scanning speed of the electron beam. If desired, the DC control signal produced by low band-pass filter 24 in FIG. 6 may be supplied to a scanning speed modulation deflector, such as shown in FIG. 3. Similarly, the DC control signal produced by the low band-pass filter in FIG. 7 may be supplied to a scanning speed modulation deflector as shown in FIG. 4. That is, the embodiments of FIGS. 3 and 6 may be combined, as may the embodiments of FIGS. 4 and 7. When such embodiments are combined, the scanning speed of the electron beam will be controlled such that dynamic changes therein will be compensated; and the speed at which the frequency $f_I$ of the mixed signal produced by mixer 12 is returned to its expected predetermined value will be relatively high.

Figure 8:
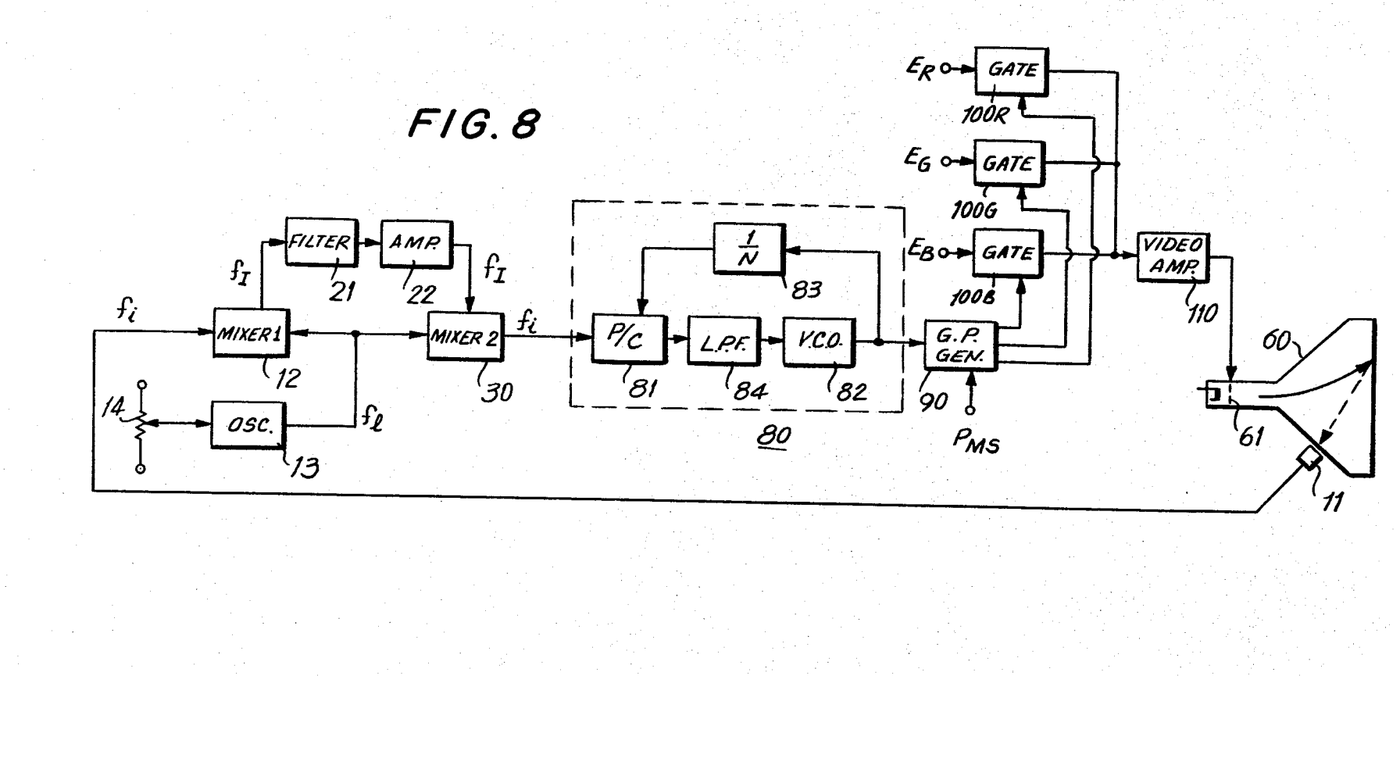
FIG. 8 is a block diagram of a portion of the beam index color television receiver with which this invention can be used.

Turning now to FIG. 8, there is illustrated a block diagram of the use of the present invention in a beam index color cathode ray tube. The cathode ray tube is provided with its usual glass envelope, and photodetector 11 is mounted on that envelope to receive light emitted from the respective index stripes (not shown) which are disposed on or at the vicinity of the display screen of the CRT, when such stripes are excited by the scanning electron beam. In FIG. 8, the solid line shown within cathode ray tube 60 represents the scanning electron beam, and the broken line represents the light emitted by an excited index stripe and detected by photodetector 11.

As mentioned above, the index signal is utilized in the beam index color cathode ray tube to control the switching of color information signals to modulate the intensity of the scanning electron beam. More particularly, the electron beam passes through a grid 61, such as the first grid of the color cathode ray tube, and color information signals are supplied to this grid so as to modulate the intensity of the electron beam passing therethrough. The color information signals are received from, for example, a conventional television broadcast, and the usual television receiver processing circuits (no shown) recover red, green and blue signals, represented as $E_R$, $E_G$ and $E_B$, respectively, from the received color television signals. These red, green and blue color signals, also commonly referred to as primary color signals, are supplied to gates 100R, 100G and 100B, respectively. Only one of these gates is turned ON at a given time, and the particular gate which is so energized gates the primary color signal supplied thereto to a video amplifier 110 which, in turn, amplifies this gated color signal and applies that signal to grid 61. As the electron beam scans a red phosphor element on the display screen of CRT 60, gate 100R is turned ON such that the red signal $E_R$ is gated therethrough to video amplifier 110 and to grid 61 so as to modulate the single scanning beam with the red information. Similarly, when the beam advances into scanning relationship with the green phosphor element, gate 100G is turned ON to gate the green signal $E_G$ therethrough, and through video amplifier 110 to grid 61 so as to modulate this beam with the green information. It now is appreciated that when the beam is in scanning relationship with a blue phosphor element, gate 100B is turned ON so as to gate the blue signal $E_B$ therethrough to video amplifier 110, from which the amplified blue signal is applied to grid 61 so as to modulate the intensity of the beam with blue information.

Each of gates 100R, 100G and 100B includes a gating signal input terminal to receive a gating signal supplied thereto by a gate pulse generator 90. The purpose of the gate pulse generator is to generate a respective gating pulse, referred to herein as red, green and blue gating pulses, in synchronism with the movement of the electron beam into scanning relationship with the red, green and blue phosphor elements, respectively. For example, if the phosphor elements are constituted by triads of red, green and blue color stripes, then as the beam scans each triad of color stripes, a gate pulse signal is generated for each of the red, green and blue stripes included within that triad. Furthermore, if the index stripes are aligned with these color phosphor stripes, and if a predetermined ratio exists between the pitch of the index stripes and the pitch of the color phosphor stripes, then the frequency $f_i$ of the index signal will exhibit a predetermined proportion relative to the scanning of the color phosphor stripes. For example, if an index stripe is provided in advance of every other color stripe, that is, if the pitch of the index stripes is $\frac{2}{3}$ of the pitch of a particular color stripe, that is, if three index stripes are scanned over an interval that only two particular color stripes (such as the red stripes) are scanned, then the frequency $f_i$ of the index signal will be 1.5 (or 3/2) times the frequency at which the particular color stripe is scanned. Now, if this index frequency $f_i$ is doubled, the resultant frequency ($2f_i$) is equal to three times the rate at which a particular color stripe is scanned. That is, this frequency is three times the rate at which each red color stripe is scanned, and also is three times the frequency at which each green color stripe is scanned, and also is three times the frequency at which each blue color stripe is scanned. The purpose of gate pulse generator 90 is to receive this doubled index frequency ($2f_i$) and to distribute, at each output thereof, a respective red, green and blue gating pulse, each gating pulse being on-third the doubled index frequency ($2f_i$) and each gating pulse being phase displaced from the others by 120°. As a result, the red gating pulses are synchronized with the scanning of the red color stripes, green gating pulses are synchronized with the scanning of the green color stripes and the blue gating pulses are synchronized with the scanning of the blue color stripes.

A phase-locked loop 80 is connected at its input to receive the amplified index signal produced by output mixer 30 (described hereinabove with respect to the embodiments of FIGS. 1-4, 6 and 7), and is connected at its output to supply the signal of doubled index frequency ($2f_i$) to gate pulse generator 90. Phase-locked loop 80 is of typical construction and includes a phase comparator 81 for comparing the phase of the amplified index signal produced by output mixer 30 to that of a frequency-divided oscillating signal produced by voltage controlled oscillator 82 and frequency-divided by a factor 1/N by divider 83. Any phase differential between these phase-compared signals produces an error signal which is supplied as a control signal via a low pass filter 84 to the voltage controlled oscillator so as to adjust the frequency of the oscillating signal generated thereby. As is conventional, the output of the voltage controlled oscillator is phase-synchronized with the amplified index signal. Any change in the frequency of this amplified index signal, discussed above with respect to the embodiment of FIGS. 3, 4, 6 and 7, results in a corresponding change in the frequency of the oscillating signal generated by voltage controlled oscillator 82.

It is seen that, if the factor N is equal to 2 (N=2), then the frequency of the oscillating signal generated by voltage controlled oscillator 82 will be twice the index frequency ($2f_i$). This is the proper frequency for the embodiment wherein the pitch of the index stripe is two-thirds of the pitch of the phosphor stripes of a particular color.

It will be appreciated that if the ratio between the pitch of the index stripes and pitch of the phosphor stripes of a particular color differs from the aforementioned ratio of $\frac{2}{3}$, then the dividing ratio N of frequency divider 83 may be other than 2. It is appreciated that this factor N is such that when the frequency of the oscillating signal generated by voltage controlled oscillator 82 is divided by N, the divided frequency is equal to the index frequency $f_i$. For example, if one index stripe is provided for every four color stripes, then N would be equal to 4. If one index stripe is provided for every five color stripes, then N would be equal to 5. Other examples will be appreciated, and additional description thereof is not provided.

Thus, the embodiment of a beam index color television cathode ray tube, and its associated control circuitry, as shown in FIG. 8 illustrates how the present invention is used to derive an oscillating signal, proportional to the frequency $f_i$ of the index signal, to control gate pulse generator 90, whereby gates 100R, 100G and 100B are synchronously turned ON so as to sequentially supply the primary color signals $E_R$, $E_G$ and $E_B$ to grid 61 so as to synchronously, and sequentially, modulate the intensity of the single scanning beam. Gate pulse generator 90 also is supplied with a so-called mode set pulse $P_{MS}$, described in greater detail in the aforementioned copending application. Briefly, the purpose of this mode set pulse is to enable gate pulse generator 90 to supply the gating signals to the respective gates only after the electron beam has scanned the lead-in portion of the display screen of CRT 60 (also known as the run-in area) and has reached the image area (also known as the viewable portion) of the screen. As an example thereof, gate pulse generator 90 may comprise a ring counter, as described in the aforementioned copending application.

While the present invention has been particularly shown and described with reference to a plurality of embodiments, it should be readily apparent to those of ordinary skill in the art that various changes and modifications in form and details may be made without departing from the spirit and scope of the invention. Some of such changes and modifications have been discussed above. In addition to them, it may be recognized that the frequency $f_i$ of the mixed signal produced by mixer 12 may be, if desired, the lower sideband of the heterodyned signals and, conversely, the output of output mixer 30 may be the upper sideband of the heterodyned signals. Still further, mixers 12 and 30 may be of typical construction in accordance with the usual heterodyne technique or, if desired, other conventional techniques for frequency conversion may be used. It is intended that the appended claims be interpreted as including the foregoing as well as various other changes and modifications.

What is claimed is:

1. In a beam index color television receiver including a picture reproducer having index stripes excited by a scanning electron beam and photodetecting means for sensing light emitted by the excited index stripes to produce an index signal having an index frequency in response thereto, the combination comprising local oscillating means for generating a local oscillating signal; first mixing means coupled to said photodetecting means and to said local oscillating means for mixing said index and local oscillating signals to produce a mixed signal; band-pass amplifying means for amplifying said mixed signal; and second mixing means coupled to said band-pass amplifying means and to said local oscillating means for mixing said mixed signals with said local oscillating signal to produce an amplified index signal having said index frequency.

2. The invention of claim 1 wherein said band-pass amplifying means is comprised of band-pass filtering means for receiving said mixed signal and having a predetermined, limited pass-band characteristic substantially centered on a particular frequency; and limiter amplifying means coupled to said band-pass filtering means for removing amplitude modulations from the filtered mixed signal.

3. The invention of claim 1 wherein said local oscillating means comprises an adjustable oscillator whose oscillating frequency is selectively adjustable.

4. The invention of claim 3 wherein said adjustable oscillator includes manual adjustment means for manually adjusting the frequency of said local oscillating signal.

5. The invention of claim 3 wherein said adjustable oscillator comprises voltage-controlled oscillating means; and programmable phase-locked loop means coupled to said voltage-controlled oscillating means to set the frequency of the latter to a programmed value.

6. The invention of claim 5 wherein said programmable phase-locked loop means comprises reference oscillating means for generating a reference oscillating signal; programmable frequency dividing means coupled to one of said voltage-controlled oscillating means and said reference oscillating means for dividing the frequency of one of said local and reference oscillating signals; phase comparator means for comparing the phase of the frequency-divided signal to the other of said local and reference oscillating signals; and means for supplying a control voltage to said voltage-controlled oscillating means as a function of the phase difference between the phase-compared oscillating signals to adjust the frequency of the oscillating signal generated by said voltage-controlled oscillating means.

7. The invention of claim 1, 2, 3, 4, 5, or 6 further comprising means for detecting a change in the frequency of said mixed signal, and correcting means responsive to the detected change in frequency to return the frequency of said mixed signal to a substantially constant frequency value.

8. The invention of claim 7 wherein said change in the frequency of said mixed signal is attributed, at least in part, to a variation in the scanning signal of said electron beam, and said correcting means comprises scanning speed modulating means to modulate the scanning speed of said electron beam and thereby minimize said variation.

9. The invention of claim 7 wherein said correcting means comprises feedback means for feeding back to said local oscillating means a control signal representing said detected change in the frequency of said mixed signal, said local oscillating means being adjustable in response to said control signal to vary the frequency of said local oscillating signal.

10. The invention of claim 9 wherein said change in the frequency of said mixed signal is attributed, at least in part, to a variation in said index frequency of said index signal; and said correcting means further comprises controllable filter means having its center frequency substantially centered on an expected predetermined index frequency and shifted in response to said detected change in the frequency of said mixed signal to follow said variation in said index frequency.

11. The invention of claim 7 wherein said means for detecting a change in the frequency of said mixed signal comprises frequency modulation detecting means coupled to said band-pass amplifier means and having its center frequency substantially centered on an expected predetermined frequency of said mixed signal and operative to produce a detected signal if the frequency of said mixed signal varies from said expected predetermined frequency.

12. The invention of claim 11 wherein said means for detecting a change in the frequency of said mixed signal further comprises filter means coupled to said frequency modulation detecting means for producing a DC signal in response to said detected signal.

13. The invention of claim 7 wherein said means for detecting a change in the frequency of said mixed signal comprises reference oscillating means for generating a reference oscillating signal whose frequency is substantially equal to an expected predetermined frequency of said mixed signal; and phase comparator means responsive to said amplified mixed signal and said reference oscillating signal to produce a detected signal as a function of the phase differential therebetween.

14. The invention of claim 13 wherein said means for detecting a change in the frequency of said mixed signal further comprises filter means coupled to said phase comparator means for producing a DC signal in response to said detected signal.

15. In a beam index color television receiver including a cathode ray tube having a display screen provided with index stripes excited by a scanning electron beam, photodetecting means for sensing light emitted by the excited index stripes to produce an index signal of an index frequency, and color switching means controlled in response to said index signal to provide color signal modulation of said scanning electron beam, the combination comprising local oscillating means for generating a local oscillating signal; first mixing means coupled to said photodetecting means and to said local oscillating means for mixing said index and local oscillating signals to produce a mixed signal of an expected predetermined frequency; band-pass amplifying means for amplifying said mixed signal, said band-pass amplifying means having a limited frequency pass band substantially centered on said expected predetermined frequency; frequency variation detecting means coupled to said band-pass amplifying means for detecting a variation in the frequency of said mixed signal from said expected predetermined frequency, said frequency variation detecting means including reference oscillating means for generating a reference oscillating signal of said expected predetermined frequency; and phase comparator means coupled to said band-pass amplifying means and said reference oscillating means for producing a control signal in response to the phase differential between said mixed and reference oscillating signals; means responsive to said control signal for returning the frequency of said mixed signal to said expected predetermined frequency; and second mixing means coupled to said local and reference oscillating means for mixing said local and reference oscillating signals to produce an amplified index signal of said index frequency.

* * * * *